United States Patent [19]

Hsu

[11] 4,325,089
[45] Apr. 13, 1982

[54] SYSTEM FOR SAFEGUARDING MAGNETICALLY RECORDED DATA

[76] Inventor: Da L. Hsu, 2203 Glen Ave., Berkeley, Calif. 94709

[21] Appl. No.: 102,231

[22] Filed: Dec. 10, 1979

[51] Int. Cl.³ .......................... G11B 5/86; G11B 15/04
[52] U.S. Cl. ........................................ 360/15; 360/60; 360/66; 360/69
[58] Field of Search ....................... 360/15, 60, 66, 69, 360/75, 137

[56] References Cited

U.S. PATENT DOCUMENTS 3,755,631 8/1973 Struzinger ............................ 360/66
4,188,648 2/1980 Guerini ............................... 360/137

*Primary Examiner*—Vincent P. Canney
*Attorney, Agent, or Firm*—Flehr, Hohbach, Test

[57] ABSTRACT

A system for safeguarding magnetically recorded data. The system includes a housing which carries a turntable on which media containing the data is stored. Sensors are provided for generating destruct signals responsive to attempts to gain unauthorized access to the data. A control circuit responds to the destruct signals for energizing an electromagnet simultaneously with rotation of the turntable so that the media is carried through the electromagnetic field created by the magnet for erasing the data.

2 Claims, 4 Drawing Figures

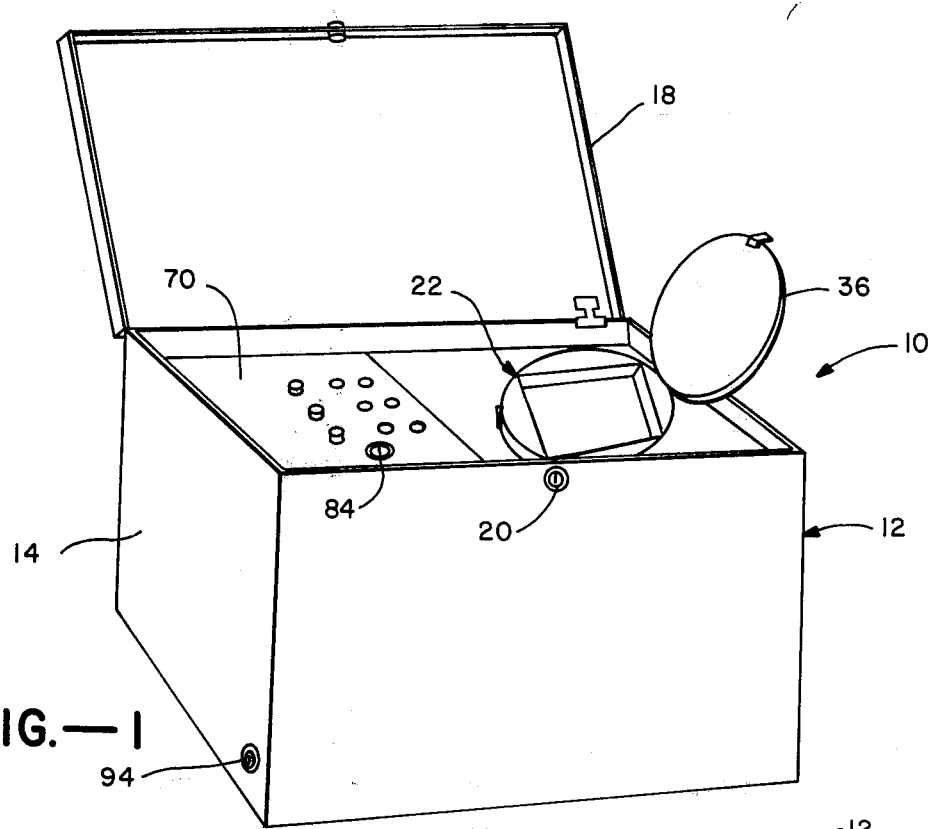
FIG.—1
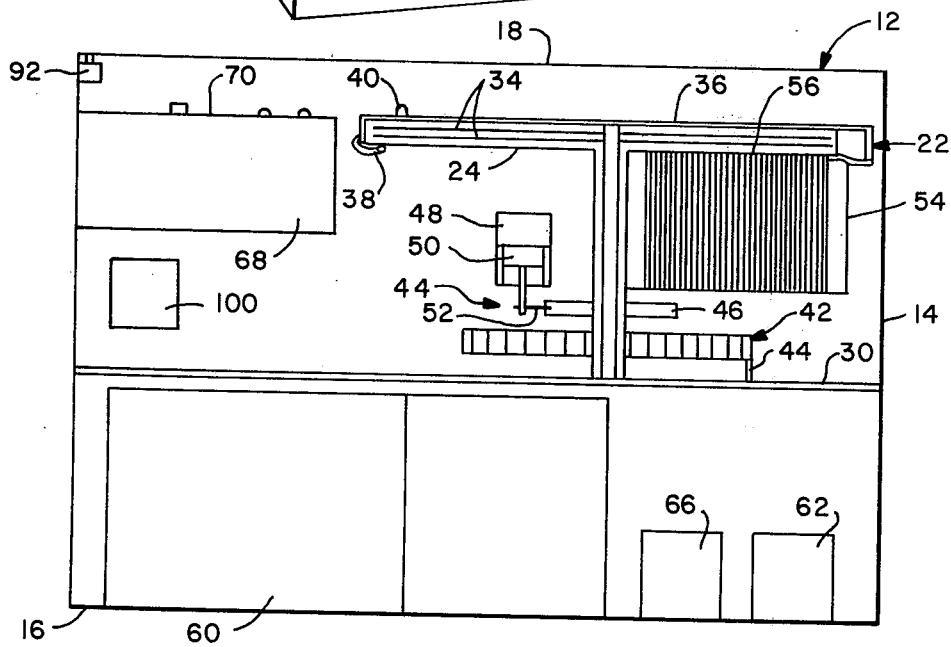
FIG.—2

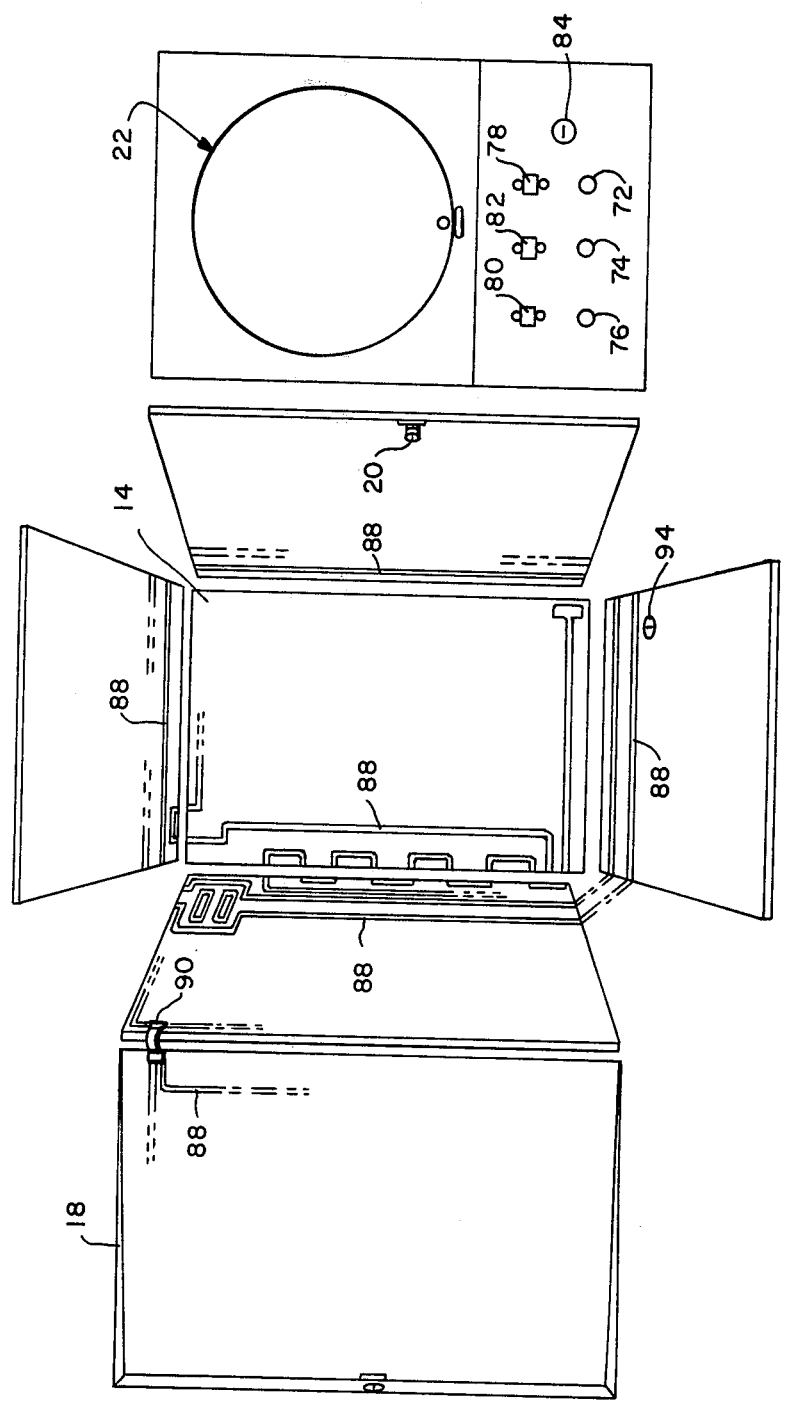

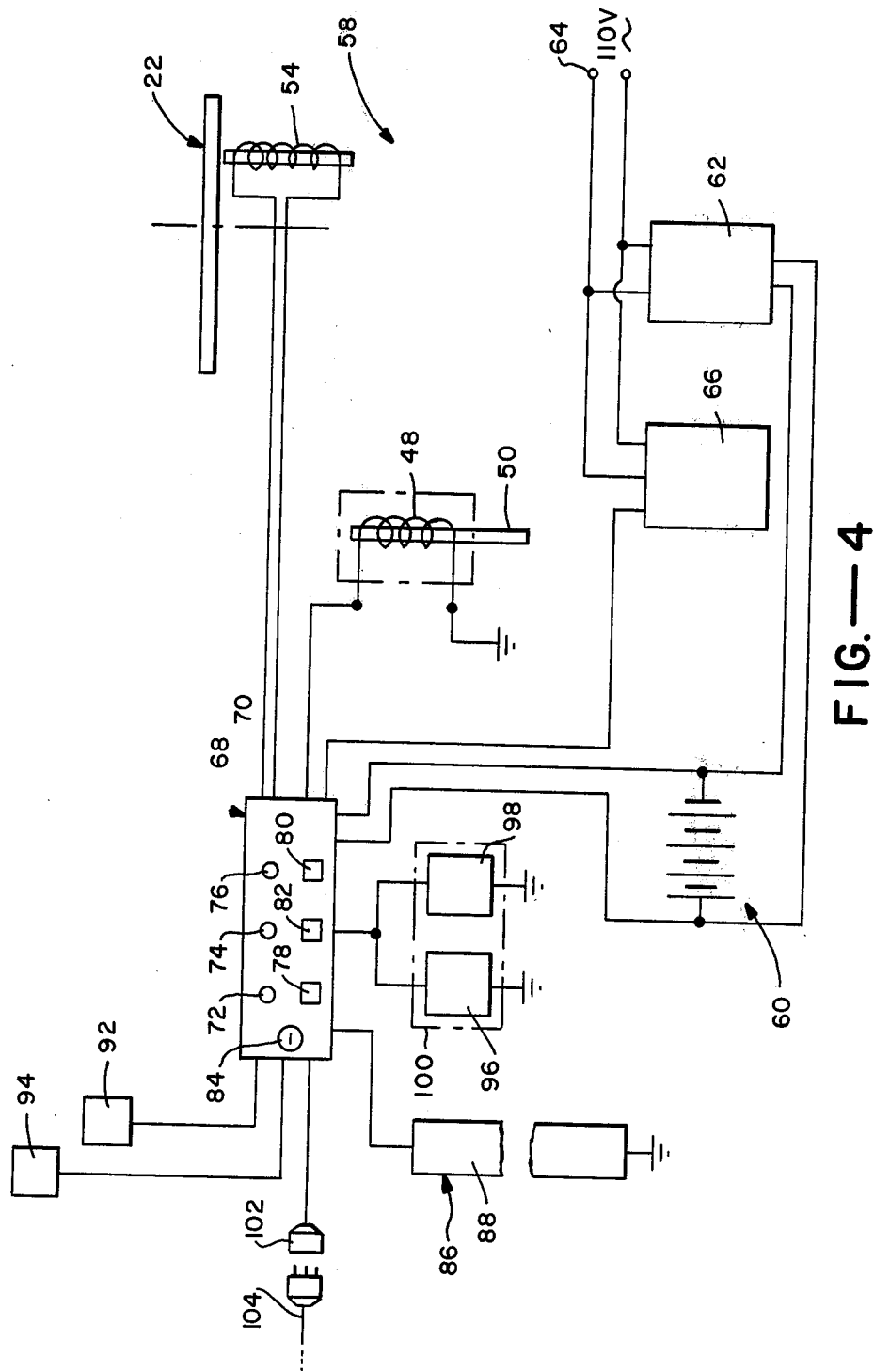
FIG.—4

SYSTEM FOR SAFEGUARDING MAGNETICALLY RECORDED DATA

This invention relates in general to computer systems and other technological fields utilizing magnetically recorded information and data.

Digital computers generally operate through the use of information and data recorded on various magnetically sensitive media such as tape, cassettes or floppy discs. Typically data such as the program and data base for the computer is encoded in binary form on the tape, cassettes or discs. Output data from the computer can be supplied either as hard copy or via recording on tape, cassettes or floppy discs, depending upon the type of terminal which interfaces with the computer.

In many cases the data recorded on the magnetic media is considered private or highly confidential to the owner and user. The data can include proprietary programs, trade secrets, customer lists, marketing data or other highly valuable business and technical information. In view of this the operators of the computers and the owners of the data have a requirement to prevent unauthorized access to the data so as to safeguard the information and secrets against appropriation or theft.

Conventional methods employed to safeguard data for use with computers includes the use of safes or lock boxes for storing the tapes, cassettes or floppy discs. However, this method of safeguard is effective only to the extent that the safe or lock box is secure from unauthorized entry. A determined safecracker with sufficient motive can with time gain access to the majority of safes. Additionally there is the cost factor in that a conventional safe with maximum security would be quite bulky and expensive, whereas it is desirable to provide the data security system in or close to the computer room for convenient day-to-day access.

Systems have previously been proposed for storing documents with a mechanism which is triggered upon unauthorized entry to physically destroy the documents such as by immersing the contents in a liquid to stain or mutilate the papers, or by destroying the documents by burning or by the action of acid. However, systems of this nature have a low data destruct capacity in view of the relatively low data storage density or hard copy. Additionally, the systems are relatively complicated and expensive in design and construction, are unreliable in operation, are dangerous in view of the hazards of explosion, fire and the corrosive materials, and have a relatively low destruction rate.

It is an object of the present invention to provide a new and improved system for safeguarding magnetically recorded information and data.

Another object is to provide a system which safeguards data recorded on a magnetic medium and which will automatically erase the data from the media upon any unauthorized attempt to gain access to the data.

Another object is to provide a data safeguard system of the type described which is simple and inexpensive in design and construction, which is highly reliable in safeguarding information, which can store and erase a high volume of data at high speed.

Another object is to provide a system of the type described which destroys the data in a method which is safe and non-explosive, non-caustic and non-incendiary.

The invention in summary includes a housing having a support for holding the medium on which data is magnetically stored. Magnetic means is provided for establishing an electromagnetic field across the medium. Means is provided for producing a destruct signal responsive to any unauthorized attempt to remove or gain access to the data, and control means is provided for responding to the destruct signal and operate the magnetic means for automatically erasing the data on the medium.

The foregoing and additional objects and features of the invention will appear from the following description in which the several embodiments have been set forth in detail in conjunction with the accompanying drawings.

FIG. 1 is a perspective view illustrating the housing incorporating the data safeguard system of the invention.

FIG. 2 is a vertical cross-sectional view of the housing of FIG. 1.

FIG. 3 is a top view, partially exploded, of the housing of FIG. 1.

FIG. 4 is a schematic diagram of the control circuit for the invention.

In the drawings FIGS. 1-3 illustrate generally at 10 one embodiment of the data destruct system of the invention. System 10 includes a safe or box-shaped housing 12 having four sidewalls 14 joined with a floor 16 and with a lid 18 hinged at one side for covering a top opening. A suitable lock 20, such as a round-key lock, is mounted at the top of the front wall for locking the lid closed to secure the contents. Preferably the walls, floor and lid of the housing are of tamper-proof steel construction.

A turntable assembly 22 is mounted within the housing for carrying the tape, cassette, floppy disc or other medium which magnetically records the data. Turntable assembly 22 comprises a circular plate 24 mounted on the end of an elongate barrel 26 which encloses a support shaft 28 for rotation about a vertical axis. The support shaft 28 in turn is carried on a platform 30 mounted within the housing. A square-shaped recess 32 (FIG. 1) is formed within the plate with dimensions suitable for accepting floppy disc format, as shown by the stacked discs 34. A circular cover 36 is hinged at one side of the turntable and is closed and secured by a latch 38. An anti-static coating is deposited on the inside surfaces of the turntable and cover to provide a suitable environment for disc storage. An upwardly projecting handle 40 is mounted on a side of the turntable for manually rotating the turntable to wind up spring means 42 provided at the base of the turntable.

Spring means 42 comprises a flat coil spring fixed at its outer end by strut 44 to platform 30 and fixed at its inner to the barrel 26 of turntable 22. A solenoid-operated detent assembly 44 is provided for releasably holding the turntable in a stand-by mode when the spring is stressed, and for releasing the turntable in an operating mode for enabling the spring to rotate the turntable. The detent assembly comprises a plurality of radially projecting teeth 46 mounted about the turntable barrel together with a solenoid comprising a coil 48 having a plunger 50 carrying an arm 52 which releasably engages the detents. When the coil is electrically energized the plunger is operated to carry the arm out of engagement with the detents.

An electromagnet 54 is mounted within the housing for establishing an electromagnetic field across at least a portion of the medium which is carried by the turntable. The coil has an upper flat face 56 which is juxtaposed in close-spaced relationship below one side of the lower wall of the turntable so that the electromagnetic field is effective for erasing the data on the medium which is carried across the upper face of the magnet when the turntable is rotated. The electromagnet can be rated on the order of 8 amps at 1000 Watts and is operated by the control circuit 58 of FIG. 4 on either AC or DC power, depending upon the particular conditions.

A storage battery 60 providing DC potential, e.g. 12 VDC at 20 to 40 amp. hrs., is mounted within the base of the housing. The battery is continually charged by a trickle charger 62 which in turn is powered by AC electricity, e.g. 110 VAC, directed to the system from an external source through a receptacle 64 and power cable. A regulator and switching unit 66 is mounted within the housing for controlling battery charging and for switching between AC and DC power modes. A control unit 68 comprising a conventional burglar alarm circuit is mounted within the housing across one side of the upper opening, and the unit includes a top panel 70 having three sets of operating buttons and indicator lights. Button 72 tests the condition of the battery, button 74 tests the sensing circuit, and button 76 tests the turntable release mechanism. Indicator light 78 is associated with button 72 and regulator 66 and is illuminated to indicate when the battery is charged. Indicator light 80 is associated with button 76 and solenoid 48 and is illuminated to indicate when the turntable is armed, i.e when the spring is wound up. Indicator light 82 is associated with the sensing circuit and button 74 and is illuminated to indicate when the sensing circuit is in an armed or stand-by status. A suitable lock 84 is provided on the panel for arming or disarming the sensing circuit.

Sensing means is provided for generating destruct signals responsive to unauthorized attempts to gain access to the data on the medium, e.g. any attempt to break into the housing or even to bodily carry the housing away. The sensing means includes a first sensing circuit 86 (FIG. 4) of which a part of the circuit consists of strips of foil tape 88. The inner walls of the housing and lid are lined with a suitable non-conducting material such as fiberglass, and the foil tape 88 is applied over the lining around the inner perimeter of and across the joints between the housing sidewalls, lid and floor. A flexible door cord 90 connects the tape applied on the lid with the main circuit. In the armed or stand-by mode the circuit applies an electrical signal through the tape strips so that when the tape is broken, as when the walls are broken into, the control unit 68 is activated to generate an electrical destruct signal. The control circuit responds to the destruct signal and operates to apply AC power to magnet 54 while simultaneously operating solenoid 48 which releases the detents to permit spring 42 to rotate the turntable and carry the medium through the electromagnetic field for destroying the data. Where there is any failure in the AC power, then upon triggering of the destruct signal switch control unit 68 operates to connect battery 60 with the magnet for establishing the field and also directs power to operate solenoid 48.

A second sensing circuit comprises a switch 92 which when armed is operated by release of the lid. When the circuit is in an armed or stand-by mode with the lid closed the switch is open to deactivate the second circuit. Should the lid be opened as by prying without first disarming, then the switch 92 is opened to generate the destruct signal which in turn operates the control unit 68 in the manner previously described for erasing the data. Arming of the second circuit is controlled by a suitable lock 94 mounted at the base of one sidewall. The lock is connected with control unit 68 and is operable between one position for disarming the circuit and another position for arming the circuit. When the circuit is disarmed the lid can be unlocked to permit authorized access to the tape or other media carried on the turntable.

A third sensing circuit comprises an inertial detector 96 and vibration detector 98 contained within unit 100 mounted within the housing. The inertial detector senses motion of the housing, such as when an attempt is made to bodily carry away the housing. When the circuit senses motion above a given pre-set threshhold level a destruct signal is generated which operates the control unit 68 in the manner previously described. Vibration detector 98 is provided to detect any attempt to gain entry into the housing as by drilling or the like. When this detector senses vibration above a given preset threshhold level a destruct signal is generated which operates the control unit 68 in the manner previously described.

A receptacle 102 is provided on one wall of the housing for coupling with a cable 104 leading to any desired external control circuit which would incorporate sensors detecting, for example, unauthorized entry into the room or other area in which system 10 is contained. In this case the outside circuit would direct the destruct signal in through receptacle 102 to control unit 68.

The system of the invention could also include an internal, single-board computer (not shown) in place of the above-described burglar alarm circuit of unit 68. With such a computer a program would be provided for generating the destruct signals responsive to various conditions and sensors, such as if the external AC power plug is disconnected. Additionally, the internal computer could signal an outside computer which could be programmed to make a telephone call requesting authorization, as by a return signal through the telephone system or otherwise, before proceeding with the remaining steps for destroying the data.

In operation of the system, the user places the floppy disc, tape or cassettes containing the data to be safeguarded on top of turntable 22. Turntable assembly 22 is armed by manually rotating the turntable to wind up spring 42 with solenoid arms 52 then engaging detents 46. Lock 84 is turned to its position for arming the control circuit and the status of the battery, sensing circuit and turntable release mechanism can be tested by depressing buttons 72, 74 and 76. Lid 36 is then closed and lock 94 turned to its position for arming the lid sensing circuit. With external AC power supplied to the unit the charger 62 is operated to maintain a charged condition of battery 60. Should any unauthorized attempt be made to gain access to the data, e.g. by prying open the lid, by breaking or drilling into the housing sidewalls or floor, or by bodily carrying the unit away, the respective sensors 92, 88, 98 and 96 respond to trigger the destruct signals in the circuit. When a destruct signal is triggered, solenoid 48 and electromagnet 54 are simultaneously energized.

When external AC power is being supplied through receptacle 64, switching unit 66 operates to direct the AC current to energize the magnet. When AC power is not available, such as when the power cable is disconnected, the switching unit directs DC current from battery 60 to energize the magnet. When solenoid coil 48 is operated plunger 50 is moved so that arm 52 releases from the detents 46, thereby permitting spring 42 to rotate turntable 22 and carry the disc 34 or other media across the upper face of the magnet so that the electromagnetic field destroys the magnetically recorded data.

It is apparent from the foregoing that Applicant has provided a novel system for safeguarding magnetically recorded data. The system is reliable and will automatically and rapidly destroy the data upon any unauthorized attempt to gain access to the data. The system has a relatively high data-destruction rate in that it can store, for example, six 8-inch floppy discs, each of which at dual density could hold the equivalent of 3,000 type-written pages of information. Thus where six discs are stored in the system a total of almost 20,000 pages of information could be destroyed within ten seconds. The system also destroys the information without the use of explosives, incendiaries, acids or the like so that it is physically safe and reliable for on-going use by individuals such as a data-operator, word-process operator or reporter with taped notes and the like. Additionally, following erasure of data the unit can be easily reset for storing another load of discs, tapes or cassettes.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. A system for safeguarding data which is magnetically stored on a medium including the combination of a housing, a support for holding the medium within the housing, magnetic means for establishing an electromagnetic field across at least a portion of the medium, means for producing a destruct signal responsive to unauthorized entry into or a given condition of the housing, and control means for energizing the magnetic means responsive to the destruct signal and for magnetically erasing the data on the medium, said support means including means for causing relative movement between the medium and the electromagnetic field, said support means comprising a turntable mounted for rotation about an axis in a plane extending through the field when the magnetic means is energized, said medium being mounted on the turntable for rotation therewith through the field including spring means for applying a force when stressed to the turntable for rotating the same about the axis, and operating means for releasing or holding the turntable against rotation in a stand-by mode while the spring means is stressed and for releasing the turntable in an operating mode responsive to the destruct signal for enabling the spring means to rotate the turntable.

2. A system as in claim 1 in which the operating means comprises detent means carried on the turntable and a solenoid having an operating plunger positioned in the stand-by mode for engaging the detent and with the plunger disengaging from the detent means responsive to the destruct signal.

* * * * *